April 30, 1968    B. MEIER    3,380,657
MIXING VALVE
Filed May 6, 1966
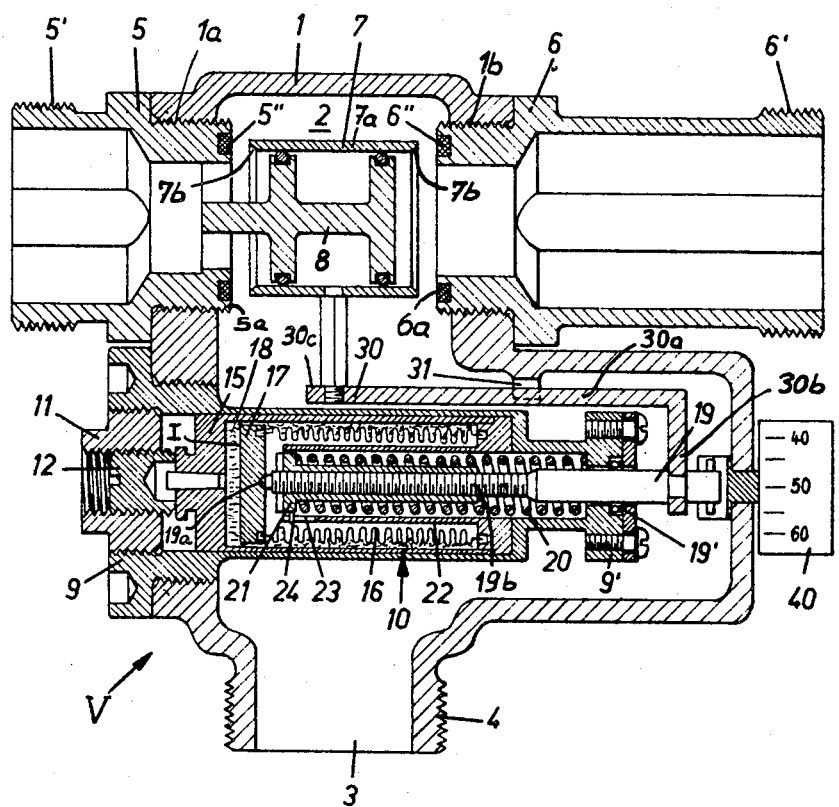
Bernhard Meier
INVENTOR United States Patent Office 3,380,657
Patented Apr. 30, 1968

3,380,657
MIXING VALVE
Bernhard Meier, Grut, near Wetzikon, Switzerland, assignor to Albert Lins, Zurich, Switzerland
Filed May 6, 1966, Ser. No. 548,082
Claims priority, application Switzerland, May 11, 1965, 6,621/65
8 Claims. (Cl. 236—12)

ABSTRACT OF THE DISCLOSURE

A mixing valve having a mixing chamber provided with hot and cold water infeed means is controlled by a valve means that includes a valve element longitudinally movable within said mixing chamber and arranged to cooperate with said infeed means; a temperature responsive feeler means, which includes a bellows means movable in parallel relation to the movement of the valve element, is also mounted in the mixing chamber; a longitudinally movable rigid means operatively interconnects said bellows means with said valve element to effect movement of said valve element by said bellows means.

---

The present invention relates to an improved mixing valve, for cold and hot water, which is equipped with an automatic temperature regulator. This temperature regulator encompasses a temperature feeler having an expansible bellows or diaphragm arranged in the mixing compartment of the valve as well as a two-way or changeover valve for regulating the infeed of cold and hot water to the mixing compartment. This two-way valve is controlled by the temperature feeler as a function of the preset mixed water temperature.

Such mixing valves, which are generally designated as so-called central mixers, as a general rule are arranged in series with the central hot-water heater (boiler) and serve to maintain the temperature of the hot water delivered to the individual outlet or tap locations at a predetermined constant value. This is in contrast with the mixing valves which commingle the water directly at the tap location or outlet.

In prior art mixing valves of this generic type a number of disadvantages have been uncovered. For instance, one drawback is that a different flow pressure acts upon the diaphragm or bellows feeler filled with a control medium and arranged in the mixing chamber or compartment. This variation in flow pressure depends upon how many tap locations are open at the same time. It should be appreciated that such flow pressure can considerably affect the control capability of the bellows. Of even greater danger is the back pressure in the conduits, particularly when a number of tap locations are simultaneously closed. This can easily lead to deformation or, in fact, rupture of the feeler. A further drawback of known mixing valves resides in the necessity of shutting off all of the water infeed and outfeed lines in the region of the mixing valve when dismantling the feeler. This requires quite expensive installations because, in such case, two shut-off elements must be provided directly in front of the mixing valve, with respect to the direction of flow, and one further shut-off element must be provided directly thereafter. Such measures are, of course, unavoidable because with time the temperature feeler is naturally subject to wear (fatigue), resulting in the bellows becoming leaky, requiring relatively frequent exchange of such feeler. Apart from this, it has further been found that the previously employed movable valve elements of the two-way valve at the openings or mouths of the cold and hot water ducts or infeeds leading into the mixing chamber, have proven themselves to be unsatisfactory. These valve elements rendered it impossible to carry out an exact control due to their sensitivity to pressure fluctuations in the conduits.

Accordingly, it is a primary object of the present invention to provide an improved mixing valve which overcomes the aforementioned disadvantages of the prior art structures.

A more specific object of the present invention is directed to the provision of an improved mixing valve wherein the temperature feeler can be easily exchanged without any influence upon the water throughflow and is protected against flow and back pressures.

Another noteworthy object of this invention has reference to an improved construction of mixing valve of the type described which is relatively robust, simple and economical in construction, highly reliable in operation, not readily subject to breakdown, and can be easily serviced and dismantled with a minimum of inconvenience.

In order to implement these and still further objects of the invention which will become more readily apparent as the description proceeds, the present invention, broadly speaking, manifests itself in the features that the temperature feeler is mounted in a removable housing extending through the mixing compartment and sealed from the latter, and an axially displaceable piston rod piercingly extends into such housing in order to transmit the bellows movement to control lever means.

Due to the measure it is now possible to remove and replace at any time, without effort, the feeler which is completely protected from flow. A mixing valve is thus provided which is characterized by its robustness and simplicity in structure.

According to a preferred embodiment, to prevent the previously considered sensitivity to pressure, the movable valve element can consist of a sleeve which is axially displaceable upon a guide or guide pin, the end or frontal faces of such sleeve forming selective sealing surfaces for cooperation with the valve seats.

Due to this feature, the flow pressure can only act upon the sealing surfaces, the small expanse of which, however, has negligible effect upon pressure sensitivity. Additionally, such physical structure of the movable valve element allows it to be guided simply, robustly and precisely.

Other features, objects and advantages of the invention will become apparent by reference to the following detailed description and drawing in which the single figure depicts an axial cross-sectional view of a preferred embodiment of inventive mixing valve.

Describing now the drawing, the embodiment of mixing valve V depicted for illustrative purposes comprises a hollow valve housing 1 internally providing a cold and hot water mixing chamber or compartment 2, here shown opening downwardly into an outlet 3 for the mixed or commingled water. Outlet or discharge means 3 is provided with a threaded portion 4 for connection to a suitable duct or pipe conduit. At the top of this valve housing 1 and extending transverse to outlet 3 there are two infeed pipes or studs 5 and 6 threadably connected into appropriate openings 1a and 1b respectively, of the aforesaid housing 1. The infeed pipe 5 provided with the threading 5' can be connected with the cold-water conduit, the infeed pipe 6 having the threading 6' with the hot-water line or conduit.

The inner frontal or end faces 5a and 6a of the infeed pipes 5 and 6 respectively, are constructed as valve seats advantageously provided with appropriate sealing rings 5" and 6" respectively. They cooperate with a movable valve element 7. This movable valve element 7 of the two-way valve unit is constructed as a hollow sleeve 7a and is axially displaceable upon a stationary guide pin 8 or equivalent guide structure. Accordingly, the end faces 7b of the sleeve 7 alternately cooperate in sealing manner with the valve seats 5a and 6a and their sealing rings 5" and 6" respectively.

A hollow cylindrical housing 9 extends substantially parallel to the coaxial axes of the infeed ducts or pipes 5 and 6 in the mixing compartment 2. This cyindrical housing 9 is threaded laterally in fluid-tight fashion into the man valve housing 1. A detachable temperature feeler means 10 is pushed into this housing 9 and fixed therein by means of a threaded closure nut 11 and adjusting screw 12.

This temperature feeler unit or means 10 consists of a hollow outer housing 15 in which there extends a substantially cup-shaped insert member I incorporating an expansible bellows or diaphragm 16 and a base member 17. In this respect it is also remarked that the outer housing 15 and the insert unit or member I delimits a compartment 18 in which there is located a suitable, well-known liquid or gaseous control medium. The axial movement of the base or floor 17, brought about by this control medium, is transmitted to a threaded piston rod 19 displaceably guided at the inner floor or base 9' of the housing 9. A suitable seal 19' ensures for a reliable fluid-tight closure of the housing 9. As shown, piston rod 19 has a threaded portion 19b and bears with its inner end 19a against the base or floor 17. It is also subjected to the action of a helical or coil spring 20. This helical spring 20 rests at one end against a hollow sleeve 21 threaded onto the threaded piston rod 19, at the other end against the floor or base 9' of the housing 9.

As should be readily apparent, rotation of the piston rod 19 brings about axial movement of the threaded sleeve 21, therefore appropriate loading or unloading of the helical spring 20, to thus provide for adjustment of the temperature feeler means 10. Mechanical separation of the bellows 16 and the spring 20 in order to prevent damage to such bellows, is provided by the intermediate sleeve 22 mounted at the feeler unit, as shown. An axially extending slot 23 at this intermediate sleeve 22 and a pin 24 at the threaded sleeve 21 extending into the aforesaid slot 23 prevents rotation of the threaded sleeve 21 when rotating the piston rod 19 during adjustment.

Transmission of the movement of the bellows 16 and the piston rod 19 to the movable valve element 7 is carried out by an approximately Z-shaped control lever unit 30. This control lever unit 30 is connected at one end 30b with the free end of the piston rod 19, with its other end 30c to the valve sleeve 7a. The web 30a of the lever unit 20 is guided at a bifurcated member or fork 31 of the housing 1. The control movement of the bellows 16 thus acts directly upon the valve sleeve 7a which is displaced to the same degree as the movement of the base or floor 17 of the feeler unit 10. Of course, it would not be any problem to provided force transmission between feeler 10 and two-way valve 7 by means of any other appropriate lever system.

As should now be readily evident from the foregoing description and the exemplary illustration of the preferred embodiment of valve V appearing in the single figure, the temperature feeler unit 10 is completely screened by the housing 9 from the water stream flowing through the mixing chamber or compartment 2, therefore is absolutely protected from flow pressures and back pressures. Moreover, this feeler unit 10 can be dismantled without taking into account the water flow, in which case then, it is only necessary to remove the threaded nut 11, whereupon the feeler unit 10 with the components 15, 16, 17 and 22 can be easily pulled out of the housing 9, during which time the water can continue to flow without obstruction.

To regulate the apparatus to a predetermined water temperature, it is possible to provide, in the usual manner, a rotatable regulating knob 40 operatively engaging with the piston rod 19. However, even without such rotary knob 40 it is equally possible to very easily carry out such an adjustment in that the feeler unit 10 is dismantled and the sleeve 21 appropriately rotated; in which case it is possible to dispense with the rotation-limiting means 23, 24.

It is further to be mentioned that it is, of course, also possible to arrange the cold and hot water infeed means of the mixing valve and thereby the two-way valve such that the direction of movement of the movable valve element is coaxial to that of the bellows or transverse thereto. In such case, there is only required a different construction of the control lever for transmitting the control movement from the bellows to the valve, without the aforedescribed mixing valve losing any of its simplicity or robustness.

While there is shown and described a present preferred embodiment of the invention it is to be distinctly understood that the invention is not limited thereto but may be otherwise variously embodied and practised within the scope of the following claims.

What is claimed is:
1. A mixing valve for cold and hot water comprising:
 a valve housing internally providing a mixing chamber for cold and hot water;
 respective infeed means for feeding cold and hot water into said mixing chamber;
 automatic temperature regulating means located within said mixing chamber, said automatic temperature regulating means incorporating temperature feeler means including bellows means movable longitudinally within said mixing chamber;
 valve means disposed in said mixing chamber in parallel relation to said feeler means for controlling the infeed of cold and hot water into said mixing chamber, said valve means including a valve element which is movable in parallel relation to the bellows means and arranged so that on longitudinal movement with respect to said infeed means flow through one infeed means is increased while the flow through the other is decreased, and vice versa;
 longitudinally movable rigid means operatively interconnecting said bellows means of said temperature feeler means with said movable valve element;
 housing means extending into said mixing chamber and sealed from the latter;
 said temperature feeler means being removably contained within said housing means; and
 a longitudinally displaceable piston rod piercingly extending into said housing means in disengageable contact with said bellows means for transmitting bellows movement to said operatively interconnecting means.

2. A mixing valve as defined in claim 1, wherein said temperature feeler means comprises a hollow outer housing, an insert unit located within said hollow outer housing, said insert unit including said bellows means, said hollow outer housing and insert unit cooperating with one another to form a compartment for a control medium.

3. A mixing valve as defined in claim 2, wherein said insert unit includes a base portion, spring means acting upon said piston rod, the portion of said piston rod piercingly extending into said housing means having one end bearing against said base portion of said insert unit, the other end of said piston rod being located outside of said housing means and operatively connected with said interconnecting means.

4. A mixing valve as defined in claim 1, further including guide means for said movable valve element, said movable valve element being a hollow sleeve member axially displaceable upon said guide means, said respective infeed means providing valve seats, said hollow sleeve member having opposed ends forming sealing surfaces cooperating with said valve seats.

5. A mixing valve as defined in claim 1, wherein said temperature feeler means comprises a hollow outer housing, an insert unit located within said hollow outer housing, said insert unit including said bellows means, said hollow outer housing and insert unit cooperating with one another to form a compartment for a control medium, said insert unit further including a base portion, spring means acting upon said piston rod, the portion of said piston rod piercingly extending into said housing means having one end bearing against said base portion of said insert unit, the other end of said piston rod being located outside of said housing means and operatively connected with said interconnecting means, means to rotate said piston rod, and means coacting with said piston rod and effective upon rotation thereof to vary the force of said spring means.

6. A mixing valve as in claim 5, wherein said means to effect rotation of said piston rod extends externally of the valve housing.

7. A mixing valve as defined in claim 6, wherein said means which extends externally of said valve housing includes temperature indicia.

8. A mixing valve as defined in claim 1, wherein said housing means extends in parallel relation to the infeed means.

References Cited

UNITED STATES PATENTS

| | | | |
|---|---|---|---|
| 1,429,257 | 9/1922 | Schulz | 236—12 |
| 1,455,934 | 5/1923 | Powers et al. | 236—12 |
| 1,932,148 | 10/1933 | Schneider et al. | 236—12 |
| 2,286,630 | 6/1942 | Landon et al. | 236—12 X |
| 2,351,086 | 6/1944 | Wells | 236—12 |
| 3,181,790 | 5/1965 | Smith | 236—12 |

ROBERT A. O'LEARY, *Primary Examiner.*

W. E. WAYNER, *Assistant Examiner.*